United States Patent
Takahashi et al.

(10) Patent No.: US 9,048,717 B2
(45) Date of Patent: Jun. 2, 2015

(54) MULTIPOLAR ELECTROMAGNETIC GENERATOR

(75) Inventors: Eri Takahashi, Berkeley, CA (US); Shadrach Joseph Roundy, Concord, CA (US)

(73) Assignee: EcoHarvester, Inc., Berkeley, CA (US)

( * ) Notice: Subject to any disclaimer, the term of this patent is extended or adjusted under 35 U.S.C. 154(b) by 350 days.

(21) Appl. No.: 12/855,835

(22) Filed: Aug. 13, 2010

(65) Prior Publication Data

US 2011/0063059 A1    Mar. 17, 2011

Related U.S. Application Data

(60) Provisional application No. 61/242,805, filed on Sep. 16, 2009.

(51) Int. Cl.
| | | |
|---|---|---|
| H02K 41/00 | (2006.01) | |
| H02K 35/04 | (2006.01) | |
| H02K 35/02 | (2006.01) | |

(52) U.S. Cl.
CPC ............... H02K 35/04 (2013.01); H02K 35/02 (2013.01)

(58) Field of Classification Search
USPC ................. 310/12.12, 12.01–12.33, 13, 14; 335/78, 181
See application file for complete search history.

(56) References Cited

U.S. PATENT DOCUMENTS

| | | |
|---|---|---|
| 4,187,453 A | 2/1980 | Rough |
| 4,471,353 A | 9/1984 | Cernik |
| 4,704,553 A | 11/1987 | Resnicow |
| 5,808,381 A | 9/1998 | Aoyama et al. |
| 5,831,352 A | 11/1998 | Takei |
| 5,844,516 A | 12/1998 | Viljanen |
| 5,894,177 A | 4/1999 | Yang |
| 6,091,167 A | 7/2000 | Vu et al. |
| 6,420,953 B1 | 7/2002 | Dadafshar |
| 6,531,793 B1 | 3/2003 | Frissen et al. |

(Continued)

FOREIGN PATENT DOCUMENTS

| | | |
|---|---|---|
| CN | 101479913 A | 7/2009 |
| JP | S60-257757 A | 12/1985 |

(Continued)

OTHER PUBLICATIONS

Stalf et al. Printed Inductors in RF Consumer Applications, IEE Transactions on Consumer Electronics, pp. 426-435, vol. 47, No. 3, Aug. 2001.

(Continued)

*Primary Examiner* — Dang Le
*Assistant Examiner* — Leda Pham
(74) *Attorney, Agent, or Firm* — Van Pelt, Yi & James LLP

(57) ABSTRACT

A power generator includes a first array of magnets or a first sheet magnet, a first conductor, and a power management circuit. The first array comprises a one dimensional or two dimensional array of magnets. The first sheet magnet includes a one dimensional or two dimensional array of alternating magnetic poles. The first conductor comprises a first serpentine conductor that is on a plurality of layers of a first multi-layer printed circuit board or a first serpentine conductor that is on one or more planes. The power management circuit provides DC power as a result of relative motion between the first array of magnets or the first sheet magnet and the first conductor.

19 Claims, 14 Drawing Sheets

(56) References Cited

U.S. PATENT DOCUMENTS

| | | |
|---|---|---|
| 6,664,664 B2 | 12/2003 | Botos et al. |
| 6,933,655 B2 | 8/2005 | Morrison et al. |
| 6,984,902 B1 | 1/2006 | Huang et al. |
| 7,019,241 B2 | 3/2006 | Grassl et al. |
| 7,057,330 B2 | 6/2006 | Buhler et al. |
| 7,126,497 B2 | 10/2006 | Face et al. |
| 7,142,075 B1* | 11/2006 | Roesler et al. .............. 335/78 |
| 7,211,909 B2 | 5/2007 | Schindler |
| 7,239,066 B2 | 7/2007 | Ott et al. |
| 7,383,911 B2 | 6/2008 | Schondorf et al. |
| 7,498,681 B1 | 3/2009 | Kellogg et al. |
| 7,535,148 B2 | 5/2009 | Harris et al. |
| 7,573,163 B2 | 8/2009 | Tu et al. |
| 7,708,123 B2 | 5/2010 | Yang |
| 7,710,288 B2 | 5/2010 | Seguchi et al. |
| 8,008,814 B2 | 8/2011 | Ida et al. |
| 8,193,781 B2* | 6/2012 | Lin et al. ..................... 322/3 |
| 2001/0035686 A1 | 11/2001 | Hwang et al. |
| 2002/0185919 A1* | 12/2002 | Botos et al. ................. 310/12 |
| 2005/0035600 A1 | 2/2005 | Albsmeier et al. |
| 2005/0134148 A1 | 6/2005 | Buhler et al. |
| 2005/0146296 A1 | 7/2005 | Klemm et al. |
| 2005/0275294 A1 | 12/2005 | Izumi et al. |
| 2007/0007827 A1* | 1/2007 | Harris et al. ................. 310/15 |
| 2007/0159011 A1* | 7/2007 | Terzian et al. ............... 310/15 |
| 2007/0296369 A1* | 12/2007 | Yeh ............................ 318/696 |
| 2008/0074083 A1* | 3/2008 | Yarger et al. ................ 320/137 |
| 2011/0018364 A1 | 1/2011 | Kim et al. |

FOREIGN PATENT DOCUMENTS

| | | |
|---|---|---|
| JP | H06133524 A | 5/1994 |
| JP | H10023729 A | 1/1998 |
| JP | 2004-527198 A | 9/2004 |
| JP | 2007-529986 A | 10/2007 |
| JP | 2007529986 A | 10/2007 |
| JP | 2009011149 A | 1/2009 |

OTHER PUBLICATIONS

Utility Model Application S57-102729 (JPS59-9637(U)), Jan. 21, 1984.

Utility Model Application S54-175495 (JPS56-94178(u)), Jul. 27, 1981.

* cited by examiner

MULTIPOLAR ELECTROMAGNETIC GENERATOR

CROSS REFERENCE TO OTHER APPLICATIONS

This application claims priority to U.S. Provisional Patent Application No. 61/242,805 entitled MULTIPOLAR ELECTROMAGNETIC GENERATOR filed Sep. 16, 2009 which is incorporated herein by reference for all purposes.

BACKGROUND OF THE INVENTION

There are many sensor application areas where there is a clear need for innovative power solutions. The market for wireless sensor networks in industrial automation, supply chain management, construction, home automation, asset tracking and environmental monitoring is expected to grow to well over 400 million devices by 2012. The average useful life of such a system is targeted to be more than 10 years, which means that the stand-alone usage of conventional batteries poses significant barriers to being a robust energy solution.

Harvesting energy from motion has been the focus of intense research. There are three common technological approaches: piezoelectric, electrostatic, and electromagnetic. Numerous research groups and companies have tried to develop miniature thin-film piezoelectric devices to harness vibrations in the last 20 years. However, one problem is that thin-film piezoelectric energy have limited power output because of their high-voltage low-current output, typically tens of volts and less than nanoamperes, which makes it difficult to convert without substantial losses. Another problem is the high intrinsic frequencies of piezoelectric (PZT) materials, typically around MHz, that can't be coupled to any vibrations or cyclical motion available for practical applications.

Other groups have focused on developing electrostatic generators. Electrostatic generators have limited power output similar to piezoelectric generators also due to the fact that they produce only high voltages and low electrical currents. Furthermore, it can be shown that in most cases electrostatic generators have lower power densities than either piezoelectric or electromagnetic generators due to the relatively low energy density of an electrostatic air gap on which the electrostatic generators rely.

On the other hand, electromagnetic power generators have the potential to supply relatively large amounts of power without being restricted to the intrinsic frequencies of piezoelectric materials. However, generating sufficient power at a desired compact scale has still not been achieved. Further, the unmatched natural frequency of a small scale device, typically kHz, cannot be coupled to the vibrations that are commonly available for most applications. Lastly, current designs require state-of-the-art precision machining and assembly (e.g., e laser cutting, electrical discharge machining (EDM), and CNC machining) or micromachining and thin film technologies (e.g., Magnetic materials, both permanent magnets and magnetic alloys, are difficult and expensive to do as thinfilms. Micromachining in general gets expensive as the size of the device gets larger, and in this case the devices need to be relatively large (~1 cm^2) to give any reasonable amount of power. At that size, micromachining becomes quite expensive.) that drastically raise manufacturing costs beyond that of batteries.

BRIEF DESCRIPTION OF THE DRAWINGS

Various embodiments of the invention are disclosed in the following detailed description and the accompanying drawings.

DETAILED DESCRIPTION

Figure 1A:
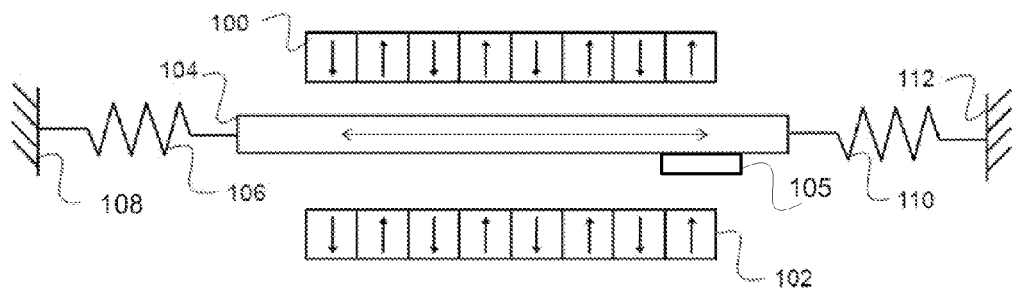
FIG. 1A is a block diagram illustrating an embodiment of a portion of a power generator.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A power generator is disclosed. In some embodiments, the power generator comprises an array of magnets positioned on a planar surface, a conductor, and a power management circuit. The array comprises a one dimensional or two dimensional array of magnets. The conductor comprises a serpentine conductor that is on a plurality of layers of a multilayer printed circuit board. The power management circuit generates DC power as a result of relative motion between the array of magnets and the conductor.

A power generator is disclosed. In some embodiments, the power generator comprises a sheet magnet, a conductor, and a power management circuit. The sheet magnet includes a one dimensional or two dimensional array of alternating magnetic poles. The conductor comprises a serpentine conductor that is on more than a single plane. The power management circuit generates DC power as a result of relative motion between the sheet magnet and the conductor.

A power generator is disclosed. In some embodiment, the power generator comprises a multipole magnet, a set of coils, and a power management circuit. The multipole magnet and the coils oscillate relative to each other. A voltage and/or current is/are generated by the relative motion between the multipole magnet and set of coils. A power management circuit conditions the power generated for use by standard electronics or electrical systems.

In some embodiments, the conductor or set of coils is implemented as a multilayer circuit board. If the circuit board is fixed, or stationary, the magnet is attached to a flexure that allows it to oscillate with respect to the conductor. If the magnet is fixed, the circuit board (or other embodiment of the coils or conductor(s)) is securely attached to a flexure that allows it to oscillate with respect to the magnet.

In some embodiments, a multilayer circuit board has a conductor on the surfaces of the multiple layers of a multilayer circuit board that present an area to the magnetic field of a multipole magnet. The multilayer circuit board is moved (e.g., oscillated) relative to the multipole magnet, or alternatively the magnet is moved relative to the circuit board. The conductor of the multilayer circuit board experiences a change in magnetic flux enclosed by the conductor due to the relative motion between the multilayer circuit board and the multipole magnet leading to a voltage and/or current generated across the planar coil created by the conductor. In some embodiments, a power management circuit conditions the power by converting an alternating voltage (e.g., due to the oscillation) to DC voltage by using rectification (e.g., a diode circuit) and storing the energy on a capacitor and/or a battery or providing the power directly to an electrical load or circuit that uses the power.

FIG. 1A is a block diagram illustrating an embodiment of a portion of a power generator. In the example shown, multipole magnet 100 and multipole magnet 102 each comprise a series of magnets with a cycle of adjacent north-south and then south-north oriented magnets. In some embodiments, multipole magnet 100 and/or multipole magnet 102 comprise(s) a sheet magnet (e.g., NdFeB sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy. In some embodiments, there is only one multipole magnet (e.g., multipole magnet 100 or multipole magnet 102) presenting a field to multilayer circuit board.

Multipole magnet 100 and multipole magnet 102 each presents a magnetic field to multilayer circuit board 104. Multipole magnet 100 and multipole magnet 102 are on opposite sides of multilayer circuit board 104. Multipole magnet 100 and multipole magnet 102 are aligned such that the stripes of north of one magnet line up with the stripes of south of the other magnet. Multilayer circuit board 104 experiences a higher magnetic field because of the two magnets (multipole magnet 100 and multipole magnet 102). Multilayer circuit board 104 moves relative to multipole magnet 100 and multipole magnet 102. Multilayer circuit board 104 is oscillated using suspension 106 and suspension 110. Suspension 106 suspends multilayer circuit board 104 from fixed structure 108. Suspension 110 suspends multilayer circuit board 104 from fixed structure 112. Suspension 106 and suspension 110 are selected such that the oscillation frequency of the suspended multilayer circuit board 104 is tailored for the motion experienced by the power generator. In various embodiments, the tailoring is achieved by selecting the size, material, mass (e.g., adding mass), or any other appropriate characteristic of multilayer circuit board 104 and/or suspension 106 and/or suspension 110. In some embodiments, weight 105 is added to multilayer circuit board 104. In some embodiments, suspension 106 and/or suspension 110 are made using low cost stamping and cutting. In some embodiments, suspension 106 and/or suspension 110 are made of plastic. In some embodiments, suspension 106 and/or suspension 110 is/are part of a suspension sheet, where the suspension sheet is coupled to multilayer circuit board 104.

In some embodiments, multilayer circuit board 104 is approximately 5.5 cm wide, 5.5 cm tall, and 1 mm thick. Multilayer circuit board 104 weighs 10 g and is suspended by using a stamped metal suspension 106 and suspension 110 with a resonant frequency of approximately 160 Hz.

In some embodiments, multilayer circuit board 104 is approximately 3.5 cm wide, 4 cm tall, and 1 mm thick. Multilayer circuit board 104 weighs 4 g and is suspended by using a metal suspension 106 and metal suspension 110 with a resonant frequency of approximately 80 Hz.

Figure 1B:
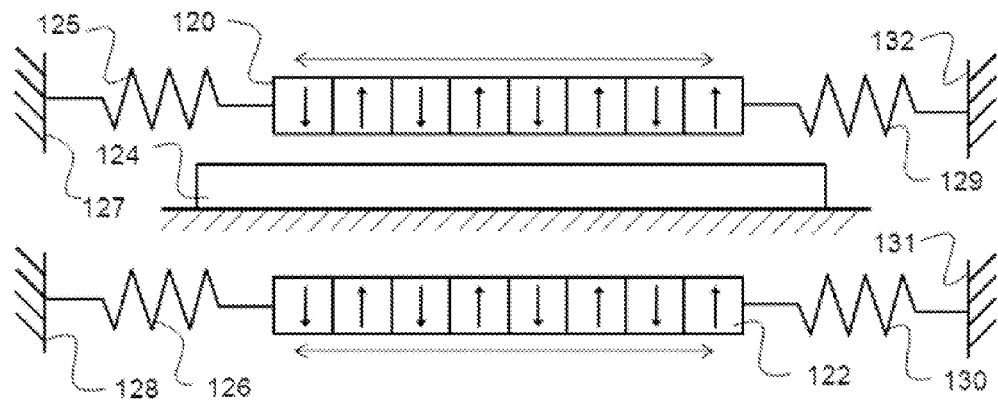
FIG. 1B is a block diagram illustrating an embodiment of a portion of a power generator.

FIG. 1B is a block diagram illustrating an embodiment of a portion of a power generator. In the example shown, multipole magnet 120 and multipole magnet 122 each comprise a series of magnets with a cycle of adjacent north-south and then south-north oriented magnets. In some embodiments, multipole magnet 120 and/or multipole magnet 122 comprise(s) a sheet magnet (e.g., NdFeB rubber sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy. In some embodiments, there is only one multipole magnet (e.g., multipole magnet 120 or multipole magnet 122) presenting a field to multilayer circuit board.

Multipole magnet 120 and multipole magnet 122 each presents a magnetic field to multilayer circuit board 124. Multipole magnet 120 and multipole magnet 122 are on opposite sides of multilayer circuit board 124. Multipole magnet 120 and multipole magnet 122 are aligned such that the stripes of north of one magnet line up with the stripes of south of the other magnet. Multilayer circuit board 104 experiences a higher magnetic field because of the two magnets (multipole magnet 120 and multipole magnet 122). Multilayer circuit board 124 moves relative to multipole magnet 120 and multipole magnet 122. Multipole magnet 120 is oscillated using suspension 125 and suspension 129. Suspension 125 suspends multipole magnet 120 from fixed structure 127. Suspension 129 suspends multipole magnet 120 from fixed structure 132. Suspension 126 suspends multipole magnet 122 from fixed structure 128. Suspension 130 suspends multipole magnet 122 from fixed structure 131. Suspension 125, suspension 126, suspension 129, and suspension 130 are selected such that the oscillation frequency of the suspended multipole magnet 120 and multipole magnet 122 is/are tailored for the motion experienced by the power generator. In various embodiments, the tailoring is achieved by selecting the size, material, mass (e.g., adding mass), or any other appropriate characteristic of multipole magnet 120 and/or multipole magnet 122 and/or suspension 125, suspension 126, suspension 129, and/or suspension 130. In some embodiments, weight is added to multilayer circuit board 124. In some embodiments, suspension 125, suspension 126, suspension 129, and/or suspension 130 are made using low cost stamping and cutting. In some embodiments, suspension 125, suspension 126, suspension 129, and/or suspension 130 are made of plastic. In some embodiments, suspension 125, suspension 126, suspension 129, and/or suspension 130. is/are part of a suspension sheet, where the suspension sheet is coupled to multipole magnet 120 or multipole magnet 122. Multipole magnet 120 and multipole magnet 122 are each allowed to oscillate independently.

Figure 1C:
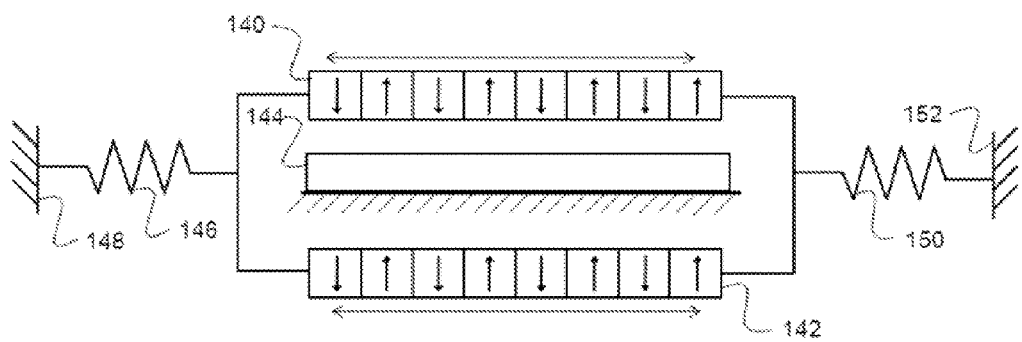
FIG. 1C is a block diagram illustrating an embodiment of a portion of a power generator.

FIG. 1C is a block diagram illustrating an embodiment of a portion of a power generator. In the example shown, multipole magnet 140 and multipole magnet 142 each comprise a series of magnets with a cycle of adjacent north-south and then south-north oriented magnets. In some embodiments, multipole magnet 140 and/or multipole magnet 142 comprise(s) a sheet magnet (e.g., NdFeB sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy. In some embodiments, there is only one multipole magnet (e.g., multipole magnet 140 or multipole magnet 142) presenting a field to multilayer circuit board.

Multipole magnet 140 and multipole magnet 142 each presents a magnetic field to multilayer circuit board 144. Multipole magnet 140 and multipole magnet 142 are on opposite sides of multilayer circuit board 144. Multipole magnet 140 and multipole magnet 142 are aligned in the resting position of the suspensions such that the stripes of north of one magnet line up with the stripes of south of the other magnet. Multilayer circuit board 144 experiences a higher magnetic field because of the two magnets (multipole magnet 140 and multipole magnet 142). Multilayer circuit board 144 moves relative to multipole magnet 140 and multipole magnet 142. Multipole magnet 140 and multipole magnet 142 are oscillated using suspension 146 and suspension 150. Suspension 146 suspends multipole magnet 140 and multipole magnet 142 from fixed structure 148. Suspension 150 suspends multipole magnet 140 and multipole magnet 142 from fixed structure 152. Suspension 146 and suspension 150 are selected such that the oscillation frequency of the suspended multipole magnet 140 and multipole magnet 142 is/are tailored for the motion experienced by the power generator. In various embodiments, the tailoring is achieved by selecting the size, material, mass (e.g., adding mass), or any other appropriate characteristic of multipole magnet 140 and/or multipole magnet 142 and/or suspension 146 and/or suspension 150. In some embodiments, weight is added to multilayer circuit board 144. In some embodiments, suspension 146 and/or suspension 150 are made using low cost stamping and cutting. In some embodiments, suspension 146 and/or suspension 150 are made of plastic. In some embodiments, or suspension 146 and/or suspension 150 is/are part of a suspension sheet, where the suspension sheet is coupled to multipole magnet 140 or multipole magnet 142. Multipole magnet 140 and multipole magnet 142 are coupled so that they oscillate together.

Figure 1D:
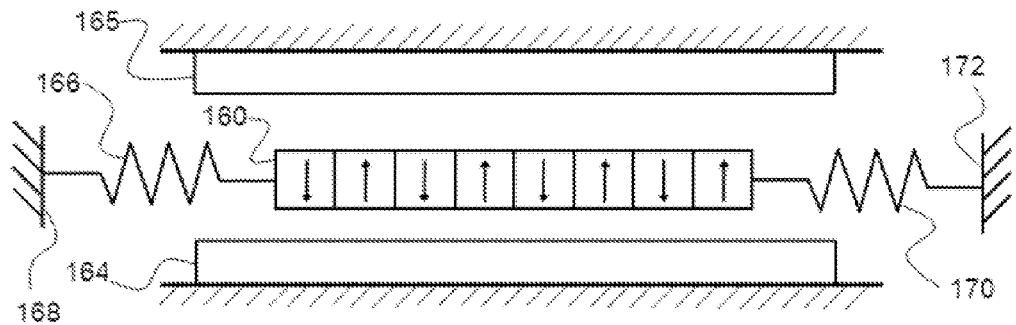
FIG. 1D is a block diagram illustrating an embodiment of a portion of a power generator.

FIG. 1D is a block diagram illustrating an embodiment of a portion of a power generator. In the example shown, multipole magnet 160 comprises a series of magnets with a cycle of adjacent north-south and then south-north oriented magnets. In some embodiments, multipole magnet 160 comprises a sheet magnet (e.g., NdFeB sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy.

Multipole magnet 160 present a magnetic field to multilayer circuit board 164 and multilayer circuit board 165. Multilayer circuit board 164 and multilayer circuit board 165 are on opposite sides of multipole magnet 160. Multilayer circuit board 164 and multilayer circuit board 165 are aligned such that the stripes of north of one magnet line up with the conductor lines in the circuit boards in the resting position of the suspensions. The motion of multipole magnet 160 presents a change in magnetic flux enclosed by the areas between conductors on multilayer circuit board 164 and multilayer circuit board 165 such that a current is generated. Multipole magnet 160 is oscillated using suspension 166 and suspension 170. Suspension 166 suspends multipole magnet 160 from fixed structure 168. Suspension 170 suspends multipole magnet 160 from fixed structure 172. Suspension 166 and suspension 170 are selected such that the oscillation frequency of the suspended multipole magnet 160 is tailored for the motion experienced by the power generator. In various embodiments, the tailoring is achieved by selecting the size, material, mass (e.g., adding mass), or any other appropriate characteristic of multipole magnet 160 and/or suspension 166 and/or suspension 170. In some embodiments, weight is added to multipole magnet 160. In some embodiments, suspension 166 and/or suspension 170 are made using low cost stamping and cutting. In some embodiments, suspension 166 and/or suspension 170 are made of plastic. In some embodiments, or suspension 166 and/or suspension 170 is/are part of a suspension sheet, where the suspension sheet is coupled to multipole magnet 160.

In some embodiments, multipole magnet 160 is approximately 3.5 cm wide, 4 cm tall, and 1 mm thick and weighs about 4 g. Multipole magnet 160 is suspended by using a stamped metal suspension 166 and suspension 170 with a resonant frequency of approximately 80 Hz.

Figure 1E:
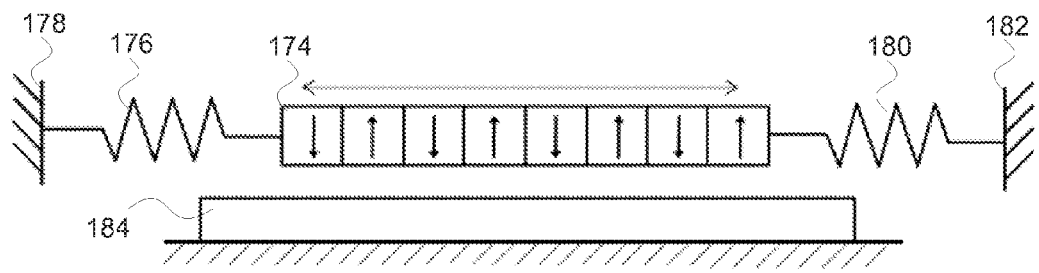
FIG. 1E is a block diagram illustrating an embodiment of a portion of a power generator.

FIG. 1E is a block diagram illustrating an embodiment of a portion of a power generator. In the example shown, multipole magnet 174 comprises a series of magnets with a cycle of adjacent north-south and then south-north oriented magnets. In some embodiments, multipole magnet 174 comprises a sheet magnet (e.g., NdFeB sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy.

Multipole magnet 174 present a magnetic field to multilayer circuit board 184. Multilayer circuit board 184 is aligned such that the stripes of north of one magnet line up with the conductor lines in multilayer circuit board 184 in the resting position of the suspensions. The motion of multipole magnet 174 presents a change in magnetic flux enclosed by the areas between conductors on multilayer circuit board 184 such that a voltage and/or current is generated. Multipole magnet 174 is oscillated using suspension 176 and suspension 180. Suspension 176 suspends multipole magnet 174 from fixed structure 178. Suspension 180 suspends multipole magnet 174 from fixed structure 182. Suspension 176 and suspension 180 are selected such that the oscillation frequency of the suspended multipole magnet 174 is tailored for the motion experienced by the power generator. In various embodiments, the tailoring is achieved by selecting the size, material, mass (e.g., adding mass), or any other appropriate characteristic of multipole magnet 174 and/or suspension 176 and/or suspension 180. In some embodiments, weight is added to multipole magnet 174. In some embodiments, suspension 176 and/or suspension 180 are made using low cost stamping and cutting. In some embodiments, suspension 176 and/or suspension 180 are made of plastic. In some embodiments, or suspension 176 and/or suspension 180 is/are part of a suspension sheet, where the suspension sheet is coupled to multipole magnet 174.

In some embodiments, multipole magnet 174 is approximately 3.5 cm wide, 4 cm tall, and 1 mm thick. Multipole magnet 174 weighs 4 g and is suspended by using a stamped metal suspension 176 and suspension 180 with a resonant frequency of approximately 80 Hz.

Figure 1F:
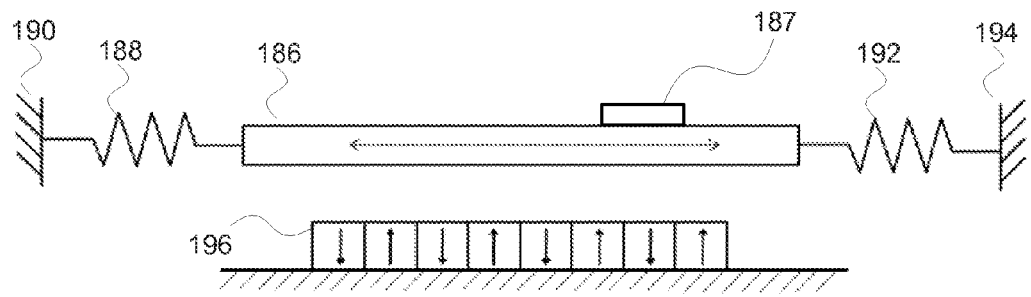
FIG. 1F is a block diagram illustrating an embodiment of a portion of a power generator.

FIG. 1F is a block diagram illustrating an embodiment of a portion of a power generator. In the example shown, multipole magnet 196 comprises a series of magnets with a cycle of adjacent north-south and then south-north oriented magnets. In some embodiments, multipole magnet 196 comprises a sheet magnet (e.g., NdFeB sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy.

Multipole magnet 196 present a magnetic field to multilayer circuit board 186. Multilayer circuit board 186 is aligned such that the stripes of north of one magnet line up with the conductor lines in multilayer circuit board 186 in the resting position of the suspensions. The motion of multilayer circuit board 186 presents a change in magnetic flux enclosed by the areas between conductors on multipole magnet 196 such that a voltage and/or current is generated. Multilayer circuit board 186 is oscillated using suspension 192 and suspension 188. Suspension 188 suspends multilayer circuit board 186 from fixed structure 190. Suspension 192 suspends multilayer circuit board 186 from fixed structure 194. Suspension 192 and suspension 188 are selected such that the oscillation frequency of the suspended multilayer circuit board 186 is tailored for the motion experienced by the power generator. In various embodiments, the tailoring is achieved by selecting the size, material, mass (e.g., adding mass), or any other appropriate characteristic of multilayer circuit board 186 and/or suspension 192 and/or suspension 188. In some embodiments, weight 187 is added to multilayer circuit board 186. In some embodiments, suspension 192 and/or suspension 188 are made using low cost stamping and cutting. In some embodiments, suspension 192 and/or suspension 188 are made of plastic. In some embodiments, or suspension 192 and/or suspension 188 is/are part of a suspension sheet, where the suspension sheet is coupled to multilayer circuit board 186.

Figure 2A:
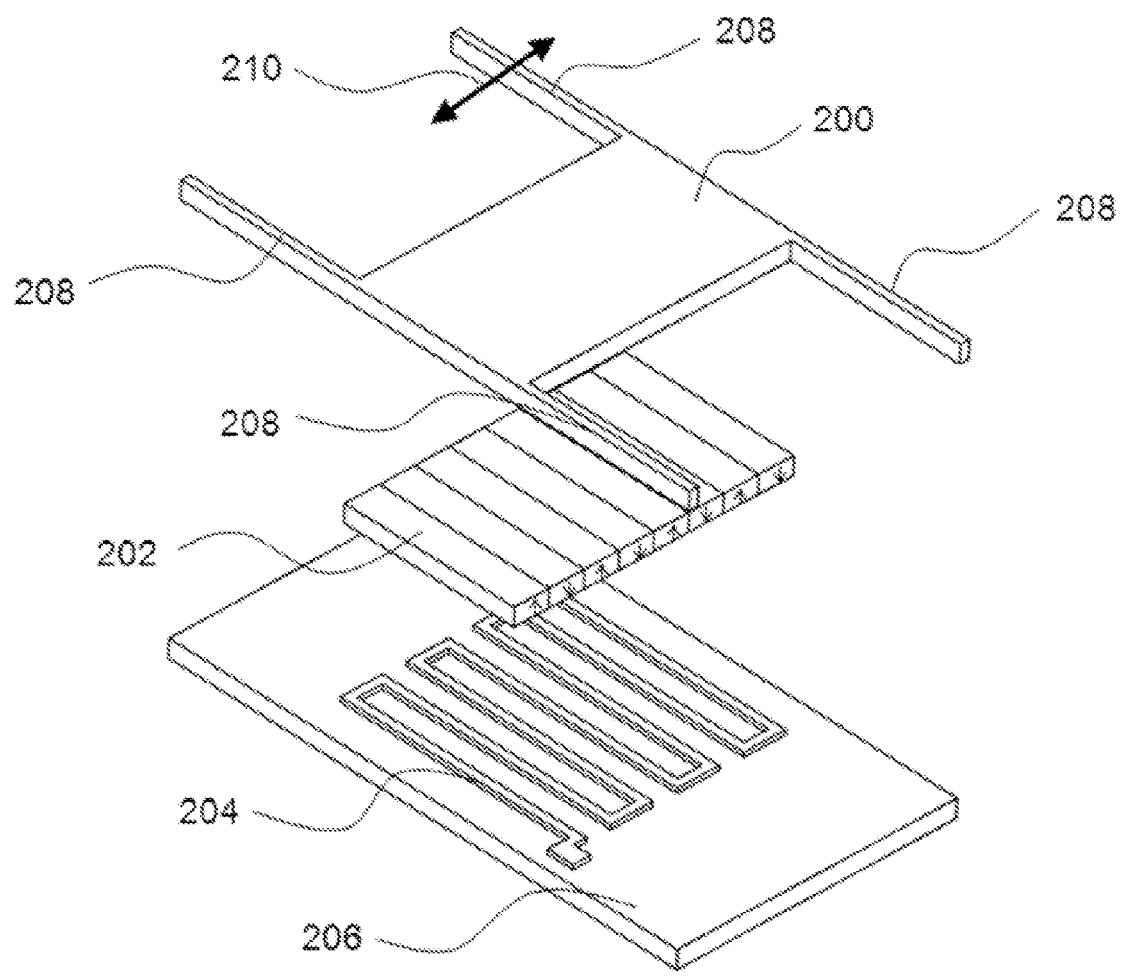
FIG. 2A is a block diagram illustrating an embodiment of a power generator.

FIG. 2A is a block diagram illustrating an embodiment of a power generator. In the example shown, suspension sheet 200 is coupled to multipole magnet 202. Suspension sheet 200 is coupled to a surrounding structure—for example, by flexures 208—making a spring-mass structure that is capable of motion/oscillation in the direction indicated by 210. Multipole magnet 202 comprises a sheet magnet with alternating stripes of poles. The direction of motion along 210 is perpendicular to the stripes of multipole magnet 202 so that the motion causes a change in magnetic field to be experienced for a fixed structure nearby the moving sheet. Suspension sheet 200 and multipole magnet 202 move relative to multilayer circuit board 206. Multilayer circuit board 206 includes conductor 204 arranged to generate current in the event that a change in magnetic flux from a multipole magnet moves (e.g., multipole magnet 202). Conductor 204 is arranged in a serpentine pattern with long lines parallel to the magnetic sheet pole stripes and short legs across the stripes. In some embodiments, a conductor appears on a plurality of layers of multilayer circuit board 206. In various embodiments, conductors on each of the plurality of layers are electrically separate from each other, conductors on each of the plurality of layers are electrically connected, conductors on each of the plurality of layers are "in parallel" with each layer conductor path—for example, similar circuit path on each layer connected at the same ends on each layer, conductors on each of the plurality of layers are "in series" for each layer conductor path—for example, similar circuit path on each layer connected at opposite ends on each layer, or any other appropriate conductor connectivity and layout.

In some embodiments, multipole magnet 202 has dimensions 35 mm×40 mm×2 mm. There are 20 stripes of width 2 mm each. The strength of the magnet is about 0.3 Tesla in the range of interest (i.e., where multilayer circuit board 206 oscillates). The serpentines are arranged to line up with the magnetic pole stripes, and there are 20×3=60 on each layer of the printed circuit board (see FIG. 3A). In various embodiments, there are 3 loops, 5 loops, or any other appropriate number of loops. There are 6 layers in multilayer circuit board 206 for a total of 360 conductors. The total mass of the oscillator is 6 grams, which includes the circuit board and some connectors and spring attachments. The resulting oscillation frequency is about 75 Hz. The peak open circuit voltage generated is about 5 volts. The coil resistance is about 10 Ohms, so when the coil is terminated with 10 Ohm resistor, the resulting peak power is 2.5 watts (5 volts, 0.5 amps). However, the average power generated over 20 mSec, which is the relevant time window for a light switch, is about 100 mW. Since this product operates in free oscillation mode, there really isn't an off-resonance operating point.

Figure 2B:
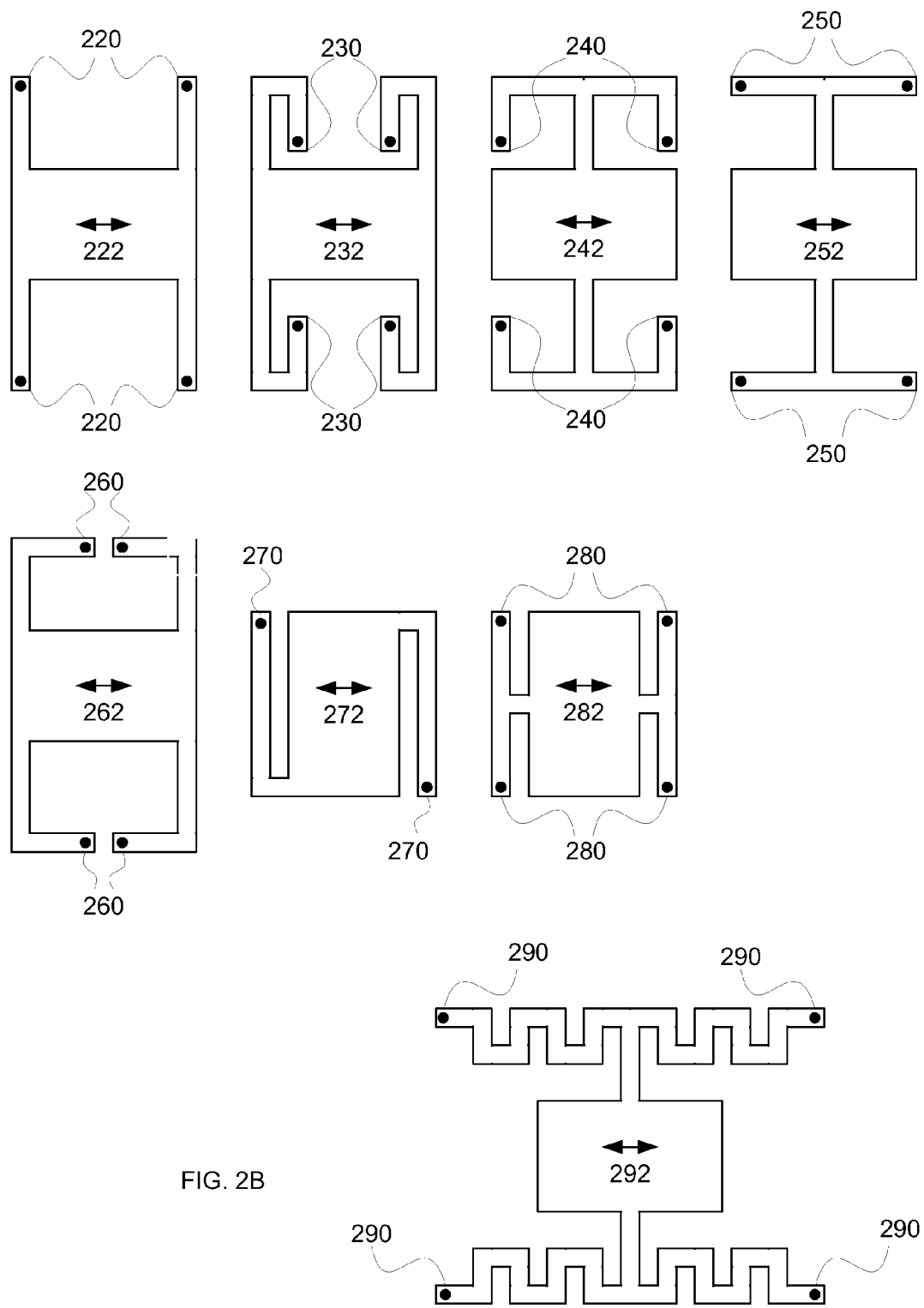
FIG. 2B are block diagrams illustrating embodiments of suspension sheet geometries.

FIG. 2B are block diagrams illustrating embodiments of suspension sheet geometries. In the examples shown, attachment points are shown for each suspension sheet (e.g., 220, 230, 240, 250, 260, 270, 280, and 290) and a direction for oscillation (e.g., 222, 232, 242, 252, 262, 272, 282, and 292). In some embodiments, the suspension sheets in FIG. 2B are made of a material that is cut or stamped or molded. In some embodiments, the suspension sheets are fabricated from a plastic. In various embodiments, the spring constant of the suspension is tuned by selecting material type, selecting material thickness, selecting material width along the arms that extend from the central body of the suspension platform to the attachment points, or any other appropriate manner of tuning the spring constant. In various embodiments, the oscillation frequency of the suspension plus multipole magnet or multilayer circuit board is tuned by selecting material type of the suspension, selecting mass of the central body of the suspension, selecting mass of the multipole magnet, selecting mass of the multilayer circuit board, or any other appropriate manner of tuning the oscillation frequency.

Figure 3A:
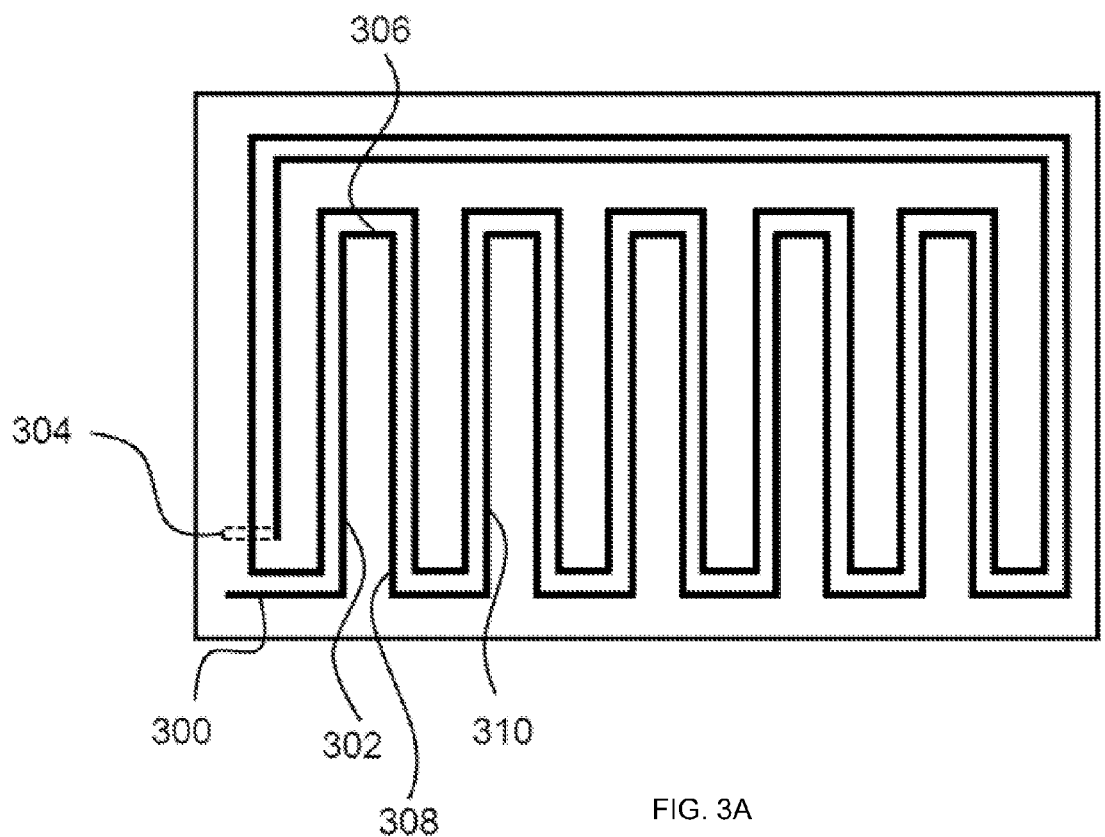
FIG. 3A is a block diagram illustrating an embodiment of a conductor layout on a layer of a multilayer circuit board.

FIG. 3A is a block diagram illustrating an embodiment of a conductor layout on a layer of a multilayer circuit board. In the example shown, conductor end 300 is coupled to conductor 302 running parallel to a magnet stripe on a multipole magnet. Conductor 302 is coupled to conductor 306 running across the magnet stripe. Conductor 306 is also coupled to conductor 308 running parallel to the magnet stripe in the multipole magnet. Similar conductors are arranged to surround other magnet stripes of the multipole magnet and are configured to generate a current when the multipole magnet moves from the change in magnetic flux enclosed by the area between conductors (e.g., between 308 and conductor 310). The conductor is arranged in a serpentine which doubles back and ends at conductor end 304. In this way, there are multiple serpentine conductors wired in series on a single layer of the circuit board. FIG. 3A shows two serpentine conductors in series. In some embodiments, conductor is on multiple layers of a circuit board and connected to other layers using vias.

Figure 3B:
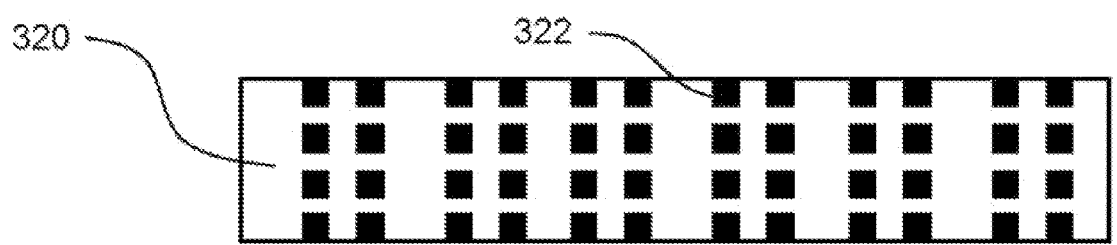
FIG. 3B is a block diagram illustrating an embodiment of a conductor in cross section view.

FIG. 3B is a block diagram illustrating an embodiment of a conductor in cross section view. In the example shown, multilayer circuit board 320 includes a plurality of conductors shown in cross section (e.g., conductor 322). The conductors are similar in pattern to those shown in FIG. 3A on each layer of the multilayer circuit board.

Figure 3C:
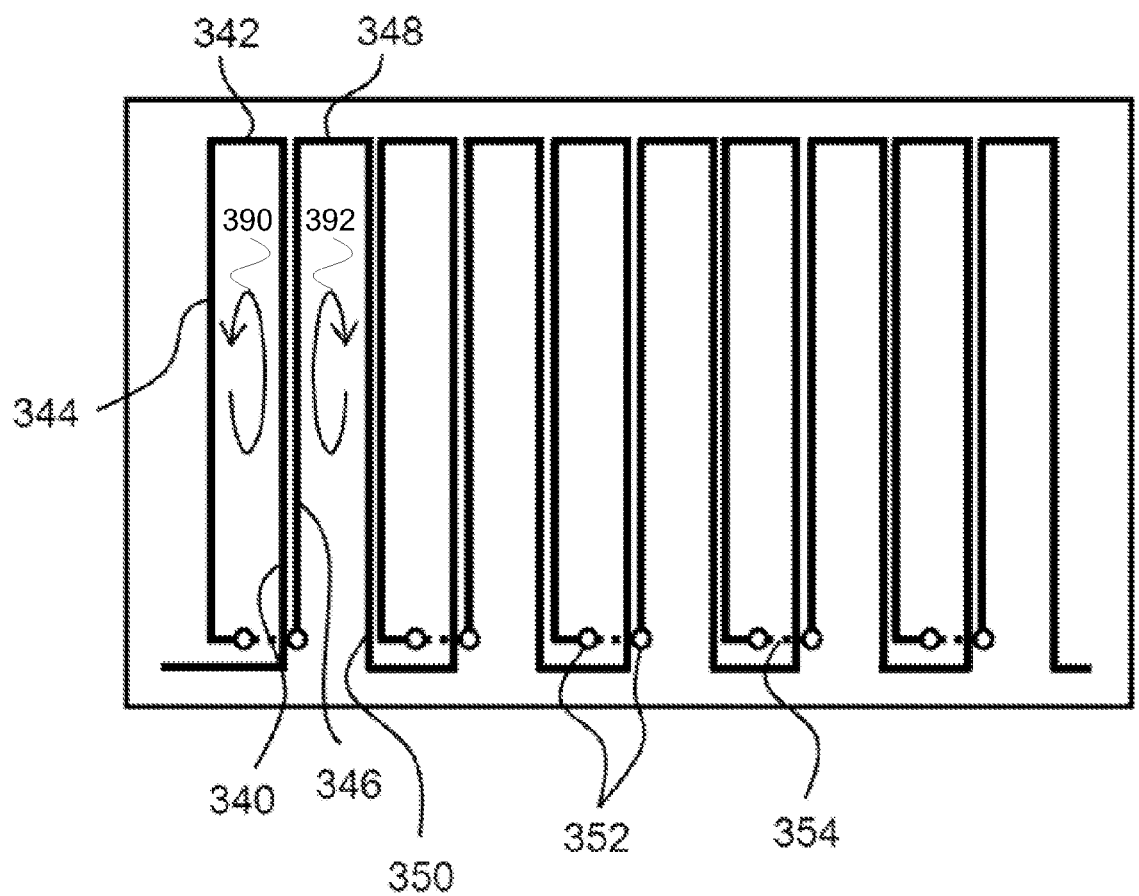
FIG. 3C is a block diagram illustrating an embodiment of a conductor on a layer of a multilayer circuit board.

FIG. 3C is a block diagram illustrating an embodiment of a conductor on a layer of a multilayer circuit board. In the example shown, the loop created by conductor 340, conductor 342, and conductor 344 generates current from one polarity of magnet of the magnetic sheet. The loop created by conductor 346, conductor 348, and conductor 350 generates current from another polarity of magnet of the magnetic sheet. The loops are connected in series through vias (e.g., vias 352). Conductor 354 is on a different layer than conductor 340, conductor 342, conductor 344, conductor 346, conductor 348, and conductor 350. In the example shown, conductor end 340 is connected to conductor end 344 through a series of vias (e.g., via 348). In the example shown, all conductors are on the same layer except those shown with a dotted line (e.g. 354). The end of conductor 344 attaches to a via which drops to a different layer so that it can go back underneath 340, but conductors 340 and 344 are on the same layer. Loop 390 generates a current from one polarity of magnet of the magnetic sheet. Loop 392 generates a current from another polarity of magnet of the magnetic sheet.

Figure 3D:
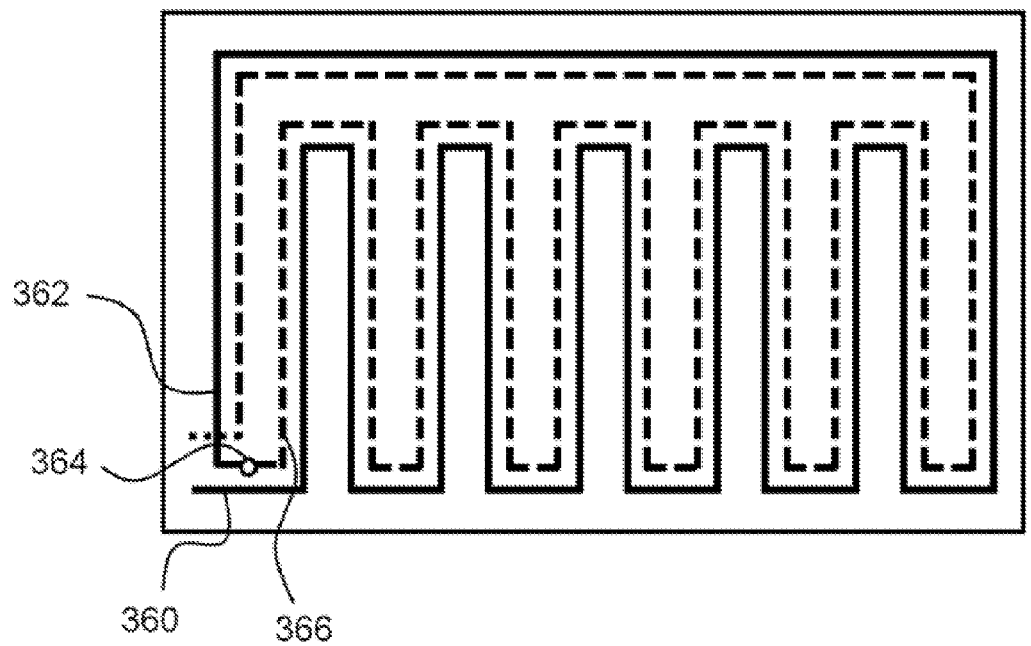
FIG. 3D is a block diagram illustrating an embodiment of a conductor on two layers of a multilayer circuit board.

FIG. 3D is a block diagram illustrating an embodiment of a conductor on two layers of a multilayer circuit board. In the example shown, conductor 360 is connected to conductor 362 on one layer of a circuit board by means of a serpentine similar to the serpentine in FIG. 3A. Conductor 362 on one layer is connected to conductor 366 on a second layer (shown by a dashed line) by means of via 364 which connects the two layers together. In this way the two serpentine conductors shown in FIG. 3D are wired together in series. While only two layers are shown, this method can be applied to any number layers.

Figure 3E:
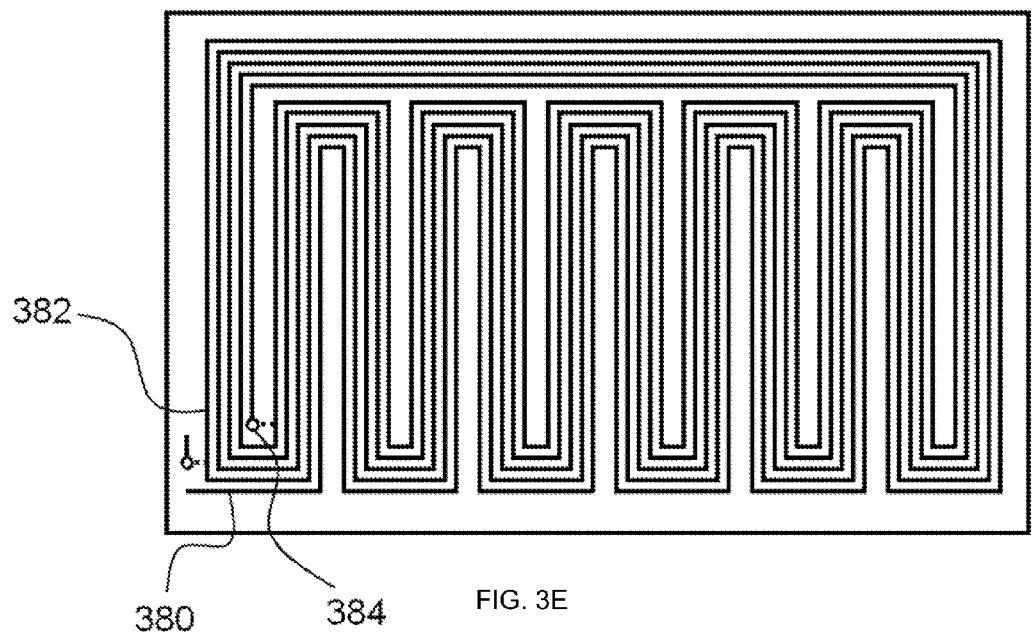
FIG. 3E is a block diagram illustrating an embodiment of a multilayer circuit board with five serpentine conductors on each one of multiple layers.

FIG. 3E is a block diagram illustrating an embodiment of a multilayer circuit board with five serpentine conductors on each one of multiple layers. In the example shown, conductor 380 is connected to conductor 382 by means of the serpentines which are wrapped around on each other similar to the serpentine in FIG. 3A. As shown, the 5 serpentines are wired in series. The serpentine conductors in each layer can then be connected to identical serpentines on other layers by means of a via such as via 384. Any number of layers could be connected together in this manner. For example, if six layers are used and each layer is connected in series with the subsequent layer similar as the layers in FIG. 3D are connected, then there would be thirty serpentine conductors all connected in series.

In some embodiments, the planar conductors are made out of stamped and laminated (or laminated then stamped) metal. The metal layers are separated by an insulated layer and connected to each other with metal vias in the insulated layer. In various embodiments, the conductors comprise wound wire or placed wire in a form or potted in an epoxy or plastic. In various embodiments, the conductors are in a serpentine shape, are in a coil shape, are on a single layer, are on a plurality of layers, are on a planar surface, are three dimensional in shape (e.g., a spiral, a laddered serpentine, etc.), or any other appropriate configuration for offering an area to a magnetic flux that results in a generation of power in the event that there is relative motion between the conductor(s) and the multipole magnet.

In some embodiments, the serpentine conductor offers areas appropriate for a two dimensional array of alternating polarity magnets.

Figure 4A:
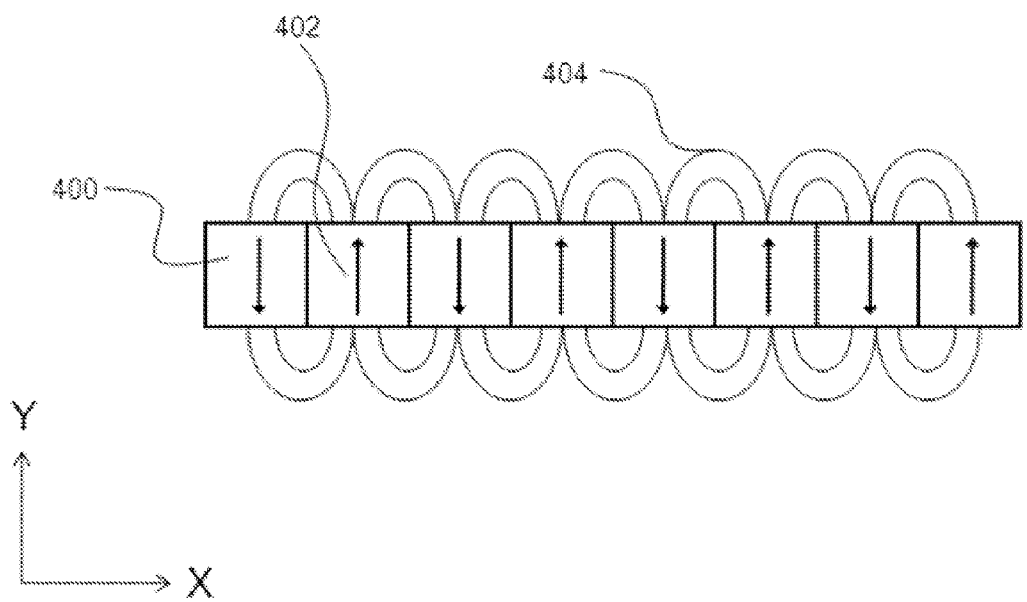
FIG. 4A is a block diagram illustrating an embodiment of a multipole magnet.

FIG. 4A is a block diagram illustrating an embodiment of a multipole magnet. In the example shown, the end view of magnet stripes (e.g., north end stripe 400, south end stripe 402) in a multipole magnet are shown along with magnetic field lines (e.g., field lines 404). Directly above the center of one of the poles the magnetic field is almost entirely in the Y direction. Directly above the transition from one pole to another, the magnetic field lines are almost entirely in the X-direction.

Figure 4B:
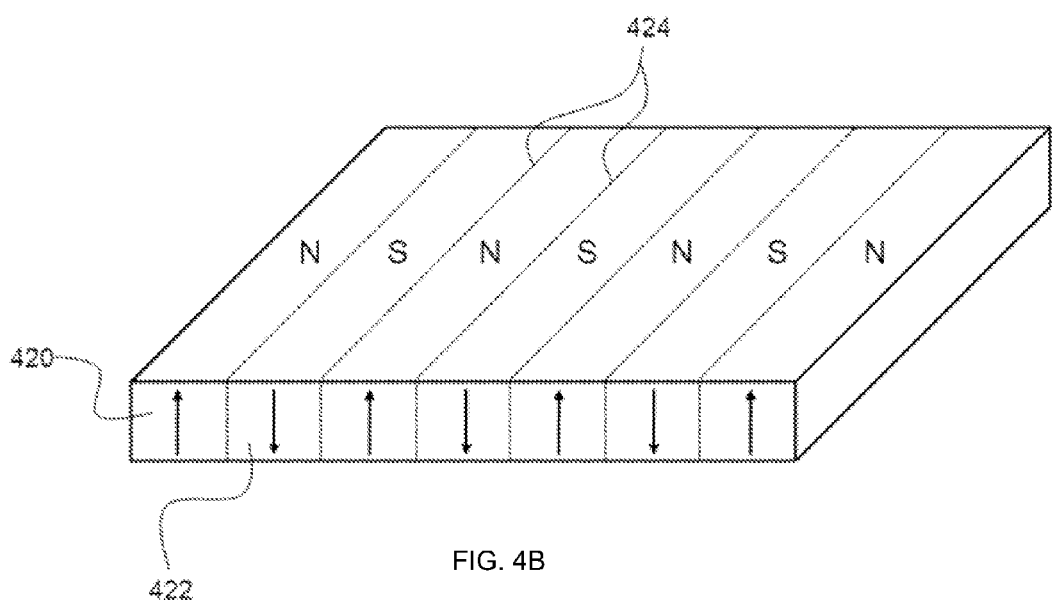
FIG. 4B is a block diagram illustrating an embodiment of a multipole magnet in the form of a magnetic sheet.

FIG. 4B is a block diagram illustrating an embodiment of a multipole magnet in the form of a magnetic sheet. In the example shown, the magnetic sheet is poled such that it has stripes or lines of alternating polarity. Magnet stripe 420 is a north section and magnet stripe 422 is a south poled section. The dotted lines 424 indicate boundaries between magnetic stripes, but are not physical separations in the magnetic sheet.

In some embodiments, the magnetic sheet is poled such that it has a two dimensional array of magnets of alternating polarity.

Figure 4C:
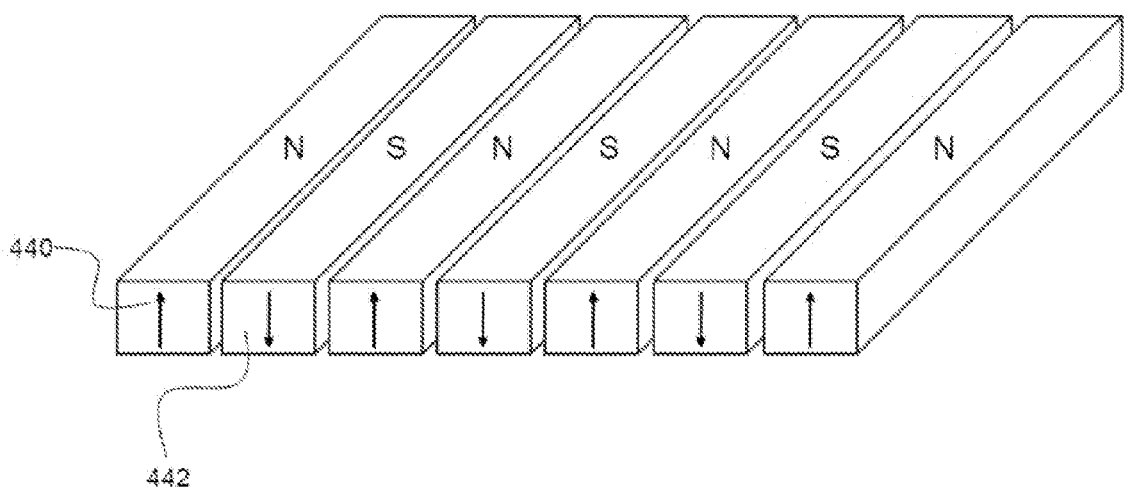
FIG. 4C is a block diagram illustrating an embodiment of a multipole magnet in the form of an array of bar magnets.

FIG. 4C is a block diagram illustrating an embodiment of a multipole magnet in the form of an array of bar magnets. In the example shown, the bars are arranged in alternating fashion. As shown in the figure, bar magnet 440 is placed with its north pole facing up, and the adjacent bar magnet 442 is placed with its south pole facing up. In some embodiments, bar magnets are affixed to a plane or flat substrate with an adhesive.

Figure 5A:
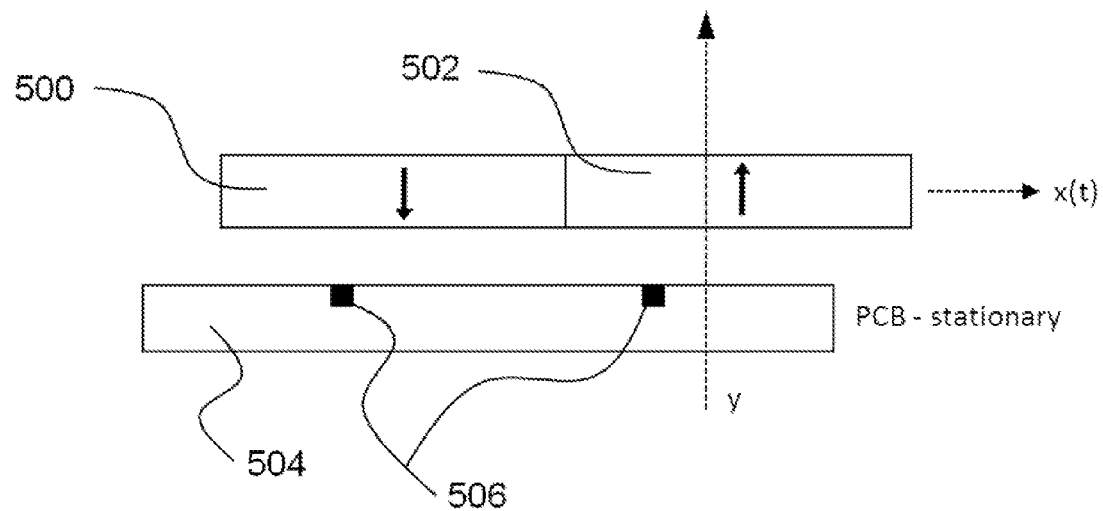
FIG. 5A is a block diagram illustrating an embodiment of a power generator.

FIG. 5A is a block diagram illustrating an embodiment of a power generator. In the example shown, directly above the center of one of the poles (e.g., poles of magnetic stripe 500 or magnetic stripe 502), the magnetic field is almost entirely in the Y direction. It is the Y direction magnetic field that is enclosed by conductors 506. As the proof mass (e.g., the multipole magnet sheet in this diagram) moves back and forth in the X direction, the magnetic flux enclosed by conductors 506 changes generating a voltage across and/or a current in conductors 506. Circuit board 504 (e.g., a stationary printed circuit board (PCB)) includes conductors 506 (e.g., lines of metal etched to appropriate shapes using standard PCB fabrication). As shown, circuit board 504 comprises one layer, however, in various embodiments comprises a plurality of layers.

It should be noted that the Y direction magnetic flux experienced by conductors 506 drops off as the magnets move apart in the Y direction because the strength of Y direction magnetic field also drops off. However, this effect is small compared to the voltage generated by the X direction motion.

Figure 5B:
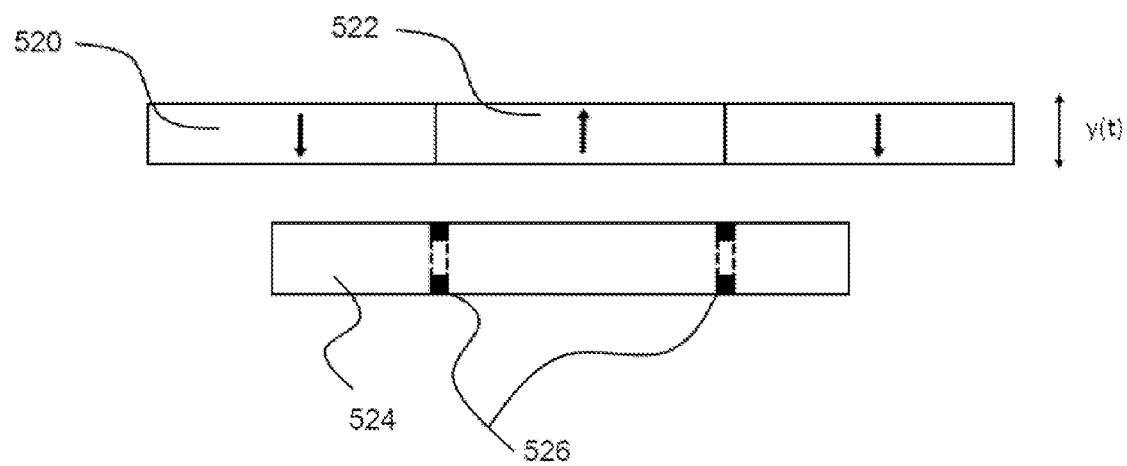
FIG. 5B is a block diagram illustrating an embodiment of a power generator.

FIG. 5B is a block diagram illustrating an embodiment of a power generator. In the example shown, power can also be generated from motion along the y axis. Directly above the transition from one pole to another (e.g., poles of magnetic stripe 520 and magnetic stripe 522), the magnetic field lines are almost entirely in the X-direction. Motion in the Y direction will produce voltage across coil conductors 526. Coil conductors 526 are shown in cross section. The flux linked by the coils will drop off as the magnets (or multilayer circuit board 524 in some embodiments) moves in the Y direction. Coil conductors 526 of FIG. 5B and coil conductors 506 of FIG. 5A can coexist on multilayer circuit board 524 (e.g., a PCB). Thus power can be generated by motion in both the X and Y direction.

It should be noted that the embodiment shown in FIG. 5B can also generate power by motion in the X direction. As the multipole magnet moves in the X direction, the X direction magnetic flux enclosed by conductors 526 changes creating a voltage across those coil conductors. Coil conductors 526 of FIG. 5B and coil conductors 506 of FIG. 5A can coexist and both produce power from motion in either the X or Y directions.

Figure 6:
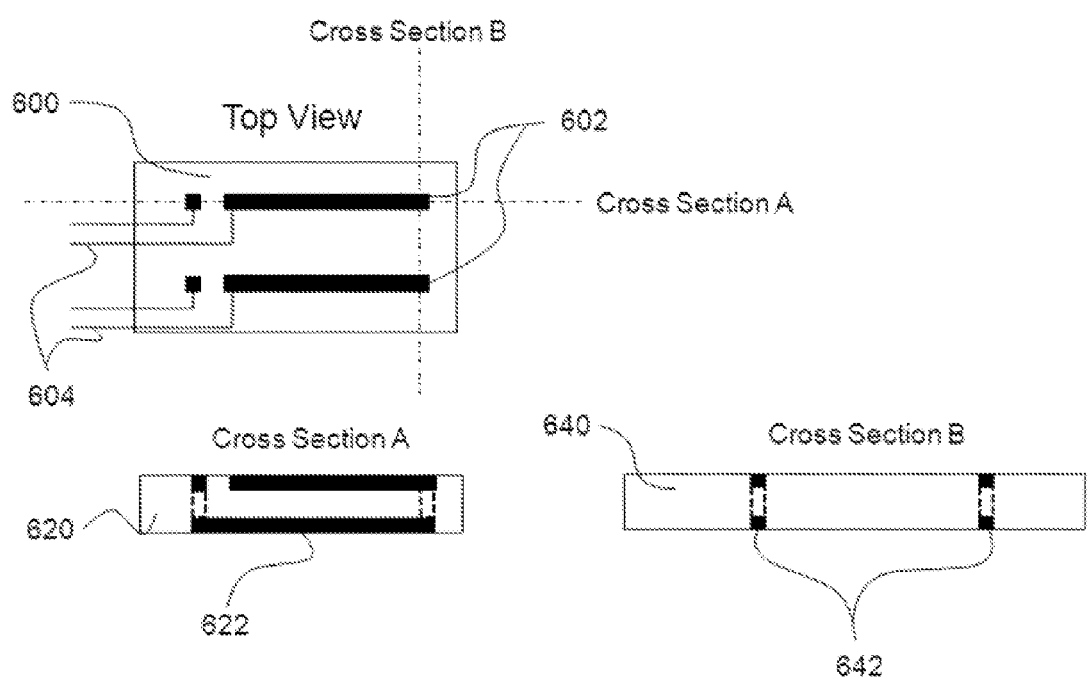
FIG. 6 are block diagrams illustrating embodiments of a coil conductor.

FIG. 6 are block diagrams illustrating embodiments of a coil conductor. In some embodiments, coil conductors in FIG. 6 are used to implement 526 of FIG. 5B. In the example shown, top view of multilayer circuit board 600 includes conductors 602 and conductors for current to be generated in response to flux changes. Conductors 602 and conductors 622 and conductors 642 show a coil structure used to capture flux changes. In some embodiments, conductors 602 are connected to a power management circuit using lines 604. In various embodiments, conductors 602 are connected in parallel, in series, or in any other appropriate manner with a power management circuit. Top view shows cross section A and cross section B lines. Cross section A shows a side view of multilayer circuit board 620. Cross section B shows a side view orthogonal to cross section B of multilayer circuit board 640.

Figure 7:
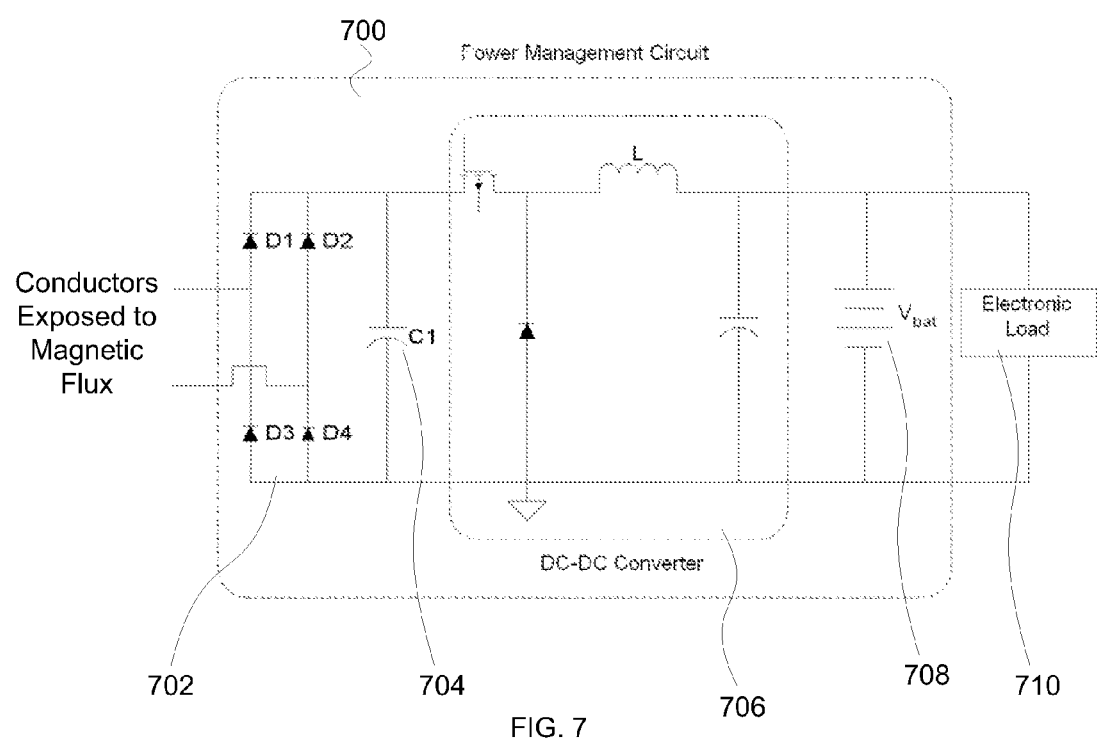
FIG. 7 is a block diagram illustrating an embodiment of a power management circuit.

FIG. 7 is a block diagram illustrating an embodiment of a power management circuit. In the example shown, power management circuit 700 comprises diode rectifier 702, capacitor 704, DC-DC converter 706, battery 708, and electronic load 710. Conductors exposed to changing magnetic flux produce a voltage/current that is fed into diode rectifier 702. Diode rectifier 702 rectifies an alternating voltage/current to a single polarity voltage/current. The single polarity voltage/current is smoothed using capacitor 704. The smoothed voltage/current is converted to a desired DC value using DC-DC converter 706. DC-DC converter 706 comprises a switch allowing a portion of an input voltage/current to charge a capacitor. The portion can be varied by varying the amount that the switch is on. The portion controls the voltage converted to. The converted voltage is fed to battery 708 and electronic load 710. In some embodiments, there is a switch between battery 708 output and electronic load 710 to control whether the output power is allowed to be input to electronic load 710.

Figure 8:
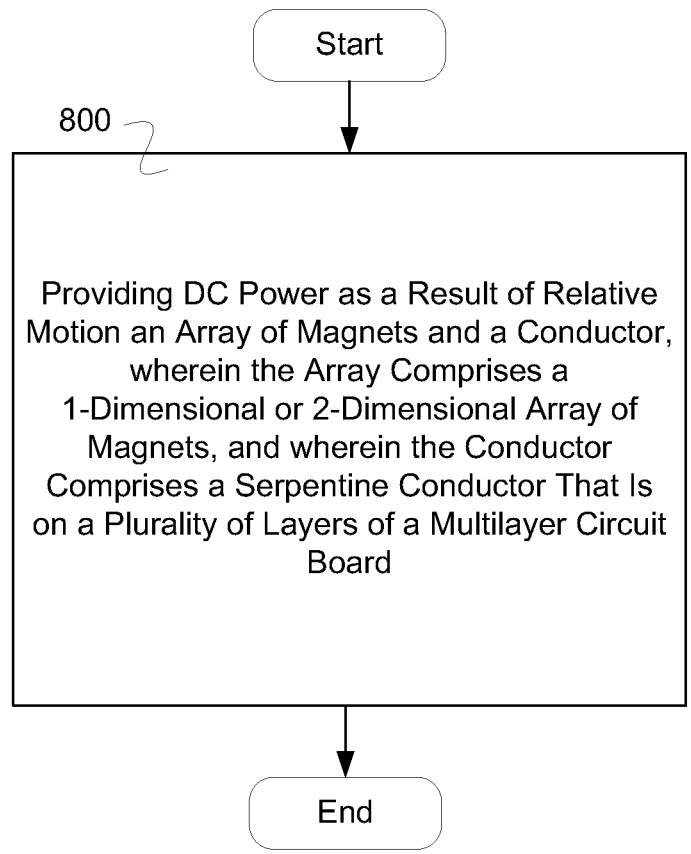
FIG. 8 is a flow diagram illustrating an embodiment of a process for generating power.

FIG. 8 is a flow diagram illustrating an embodiment of a process for generating power. In the example shown, in 800 DC power is provided as a result of relative motion between an array of magnets and a conductor, wherein the array comprises a one dimensional or two dimensional array of magnets, and wherein the conductor comprises a serpentine conductor that is on a plurality of layers of a multilayer printed circuit board.

Figure 9:
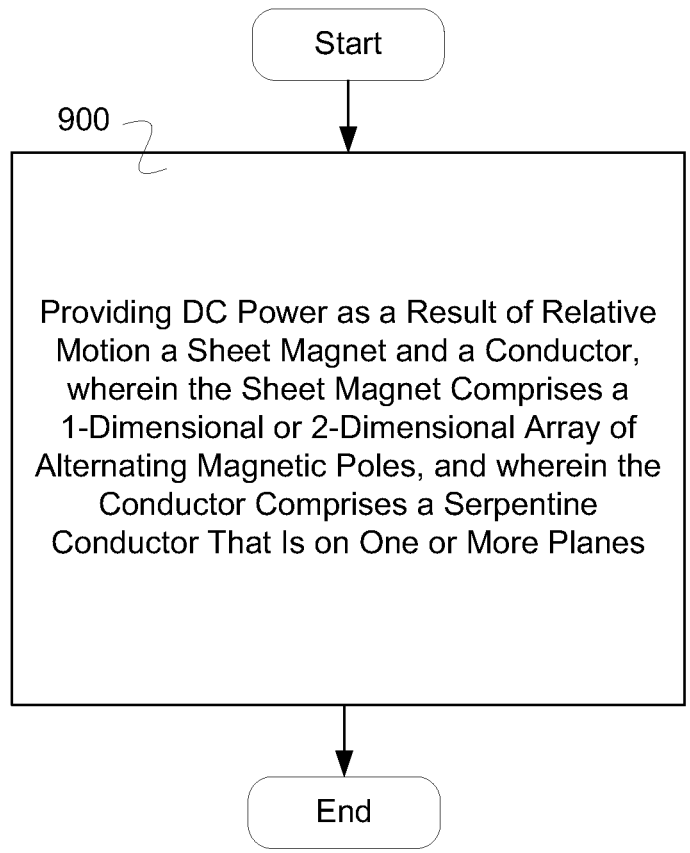
FIG. 9 is a flow diagram illustrating an embodiment of a process for power management.

FIG. 9 is a flow diagram illustrating an embodiment of a process for generating power. In the example shown, in 900 DC power is provided as a result of relative motion between a sheet magnet and a conductor, wherein the array comprises a one dimensional or two dimensional array of alternating magnetic poles, and wherein the conductor comprises a serpentine conductor that is on one or more planes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A power generator comprising:
a first array of magnets positioned on a planar surface, wherein the first array comprises a one dimensional or two dimensional array of magnets, wherein the first array of magnets comprises a sheet magnet with stripes of alternating magnetic poles;
a serpentine conductor, wherein the serpentine conductor is on a plurality of layers of a multilayer printed circuit board, wherein the serpentine conductor comprises a first plurality of serpentines wired in series on a single layer of the multilayer printed circuit board, wherein a serpentine of the first plurality of serpentines wired in series comprises a first conductor running parallel to a magnetic stripe coupled to a second conductor running across the same magnetic stripe, and the second conductor coupled to a third conductor running parallel to the same magnetic stripe, and the third conductor coupled to a fourth conductor running across an adjacent magnetic stripe, wherein the second conductor and fourth conductor running across the magnetic stripe is shorter than the first conductor and the third conductor running parallel to the magnetic stripe, wherein the adjacent magnetic stripe is of a different magnetic orientation;
and
a power management circuit, wherein the power management circuit provides DC power as a result of relative motion between the first array of magnets and the serpentine conductor, wherein the DC power comprises an average power of less than 200 mW over a period of 20 mSec, and wherein the relative motion has a resonant frequency of less than 200 Hz.

2. A power generator as in claim 1, wherein the serpentine conductor further comprises a second plurality of serpentines wired in series on a second layer of the multilayer printed circuit board.

3. A power generator as in claim 2, wherein the second plurality of serpentines on the second layer of the multilayer printed circuit board is connected to the first plurality of serpentines through one or more vias.

4. A power generator as in claim 1, wherein the relative motion comprises motion parallel to the planar surface.

5. A power generator as in claim 1, wherein the relative motion comprises motion perpendicular to a polarity direction of the first array.

6. A method of generating power comprising:
providing DC power, through a power management circuit, as a result of relative motion between a first array of magnets and a serpentine conductor, wherein the DC power comprises an average power of less than 200 mW over a period of 20 mSec, and wherein the relative motion has a resonant frequency of less than 200 Hz, wherein:
the first array of magnets positioned on a planar surface comprises a one dimensional or two dimensional array of magnets, wherein the first array of magnets comprises a sheet magnet with stripes of alternating magnetic poles;
the serpentine conductor is on a plurality of layers of a multilayer printed circuit board, wherein the serpentine conductor comprises a first plurality of serpentines wired in series on a single layer of the multilayer printed circuit board, wherein a serpentine of the first plurality of serpentines wired in series comprises a first conductor running parallel to a magnetic stripe coupled to a second conductor running across the same magnetic stripe, and the second conductor coupled to a third conductor running parallel to the same magnetic stripe, and the third conductor coupled to a fourth conductor running across an adjacent magnetic stripe, wherein the second conductor and fourth conductor running across the magnetic stripe is shorter than the first conductor and the third conductor running parallel to the magnetic stripe, wherein the adjacent magnetic stripe is of a different magnetic orientation.

7. A power generator comprising:
a first sheet magnet, wherein the first sheet magnet includes a thin sheet with a one dimensional or two dimensional array of alternating magnetic poles, wherein the one or two dimensional array of alternating magnetic poles comprises stripes of alternating magnetic poles;
a first conductor, wherein the first conductor comprises a first serpentine conductor that is on one or more planes, the first serpentine conductor including 2 or more serpentines wired in series on a single layer of the multilayer printed circuit board, wherein a serpentine of the 2 or more serpentines comprises a s-shape going back and forth across a layer of the multilayer printed circuit board, wherein the 2 or more serpentines are arranged to line up with the stripes of alternating magnetic poles of the sheet magnet;
and
a power management circuit, wherein the power management circuit provides DC power as a result of relative motion between the first sheet magnet and the first conductor, wherein the DC power comprises an average power of less than 200 mW over a period of 20 mSec, and wherein the relative motion has a resonant frequency of less than 200 Hz.

8. A power generator as in claim 7, wherein the first conductor is electrically connected to a second serpentine conductor on a second plane of the multilayer printed circuit board, wherein the second serpentine conductor includes a second two or more serpentines wired in series.

9. A power generator as in claim 7, wherein the first conductor comprises two or more serpentine conductors wired in series on a single layer of a multilayer printed circuit board, wherein the two or more serpentine conductors are similar in pattern to each other and nested within each other on the same plane of the multilayer printed circuit board.

10. A power generator as in claim 7, wherein the relative motion comprises motion parallel to the planar surface.

11. A power generator as in claim 7, wherein the relative motion comprises motion perpendicular to a polarity direction of the first array.

12. A method of generating power comprising:
providing DC power, through a power management circuit, as a result of relative motion between a first sheet magnet and a first conductor, wherein the DC power comprises an average power of less than 200 mW over a period of 20 mSec, and wherein the relative motion has a resonant frequency of less than 200 Hz, wherein:
the first sheet magnet comprises a thin sheet with a one dimensional or two dimensional array of alternating magnetic poles, wherein the one or two dimensional array of alternating magnetic poles comprises stripes of alternating magnetic poles,
the first conductor comprises a first serpentine conductor that is on one or more planes, the first serpentine conductor including a plurality of serpentines wired in series on a single layer of the multilayer printed circuit board, wherein a serpentine of the 2 or more serpentines comprises a s-shape going back and forth across a layer of the multilayer printed circuit board, wherein the 2 or more serpentines are arranged to line up with the stripes of alternating magnetic poles of the sheet magnet.

13. A power generator as in claim 1, wherein the first plurality of serpentines includes 5 or more serpentines wired in series on the single layer of the multilayer printed circuit board.

14. A power generator as in claim 1, wherein the first array of magnets includes a first magnet with no physical separation from a second magnet, the first magnet having an opposite north-south orientation from the second magnet.

15. A power generator as in claim 1, further comprising a suspension sheet coupled to the first array of magnets, wherein the suspension sheet comprises flexures that is capable of oscillation of the first array of magnets over the serpentine conductor on the multilayer printed circuit board.

16. A power generator as in claim 15, wherein the suspension sheet is made using stamping and cutting.

17. A power generator as in claim 1, further comprising a suspension sheet coupled to the multilayer circuit board, wherein the suspension sheet comprises a flexure that is capable of oscillation the multilayer circuit board over the first array of magnets.

18. A power generator as in claim 1, wherein a weight is added to multilayer circuit board.

19. A power generator as in claim 1, wherein the serpentine conductor comprises the first plurality of serpentines to loop back on a same layer to form a conductor parallel to the first plurality of serpentines on a single layer of the multilayer printed circuit board.

\* \* \* \* \*